United States Patent
Sugita et al.

(10) Patent No.: US 8,345,182 B2
(45) Date of Patent: Jan. 1, 2013

(54) LIQUID CRYSTAL DISPLAY DEVICE

(75) Inventors: Tatsuya Sugita, Takahagi (JP); Masaya Adachi, Hitachi (JP); Shoichi Hirota, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1055 days.

(21) Appl. No.: 12/019,013

(22) Filed: Jan. 24, 2008

(65) Prior Publication Data

US 2008/0218461 A1 Sep. 11, 2008

(30) Foreign Application Priority Data

Mar. 5, 2007 (JP) ................................. 2007-054206

(51) Int. Cl.
G02F 1/1335 (2006.01)

(52) U.S. Cl. .............. 349/62; 349/97; 349/95; 349/106; 257/79

(58) Field of Classification Search ............... 349/68, 349/62, 95–97, 106; 257/79
See application file for complete search history.

(56) References Cited

U.S. PATENT DOCUMENTS

| | | | | |
|---|---|---|---|---|
| 6,002,385 A * | 12/1999 | Silverbrook | ................. | 345/100 |
| 6,600,528 B2 * | 7/2003 | Colgan et al. | ................. | 349/95 |
| 6,606,135 B2 * | 8/2003 | Nakanishi et al. | ............. | 349/95 |
| 6,791,639 B2 * | 9/2004 | Colgan et al. | ................. | 349/95 |
| 7,755,652 B2 * | 7/2010 | Credelle et al. | ............. | 345/694 |
| 2002/0039157 A1 * | 4/2002 | Nakanishi et al. | ............. | 349/95 |
| 2005/0041295 A1 * | 2/2005 | Yoshikawa et al. | ........... | 359/619 |
| 2006/0087612 A1 * | 4/2006 | Kuan et al. | ..................... | 349/165 |
| 2006/0109399 A1 * | 5/2006 | Kubota et al. | ................. | 349/96 |
| 2007/0040950 A1 * | 2/2007 | Jung | ................................ | 349/5 |
| 2007/0064190 A1 * | 3/2007 | Kim | ............................. | 349/142 |
| 2007/0229737 A1 * | 10/2007 | Takeda | ........................ | 349/117 |
| 2007/0272829 A1 * | 11/2007 | Nakagawa et al. | ........ | 250/208.1 |
| 2010/0060820 A1 * | 3/2010 | Kleppinger et al. | ........... | 349/68 |

FOREIGN PATENT DOCUMENTS

| | | |
|---|---|---|
| JP | 09-197392 | 7/1997 |
| JP | 10-197859 | * 7/1998 |
| JP | 2002-189216 | 7/2002 |
| JP | 2003-255318 | 9/2003 |
| JP | 2004-170792 | 6/2004 |
| JP | 2006-72249 | 3/2006 |

* cited by examiner

*Primary Examiner* — Edward Glick
*Assistant Examiner* — Sang Nguyen
(74) *Attorney, Agent, or Firm* — Antonelli, Terry, Stout & Kraus, LLP.

(57) ABSTRACT

A liquid crystal display device including lenticular lenses and color separation filters, associated with a subpixel row direction, on the backlight side with respect to lenticular lenses. In a RGW row, a color separation filter reflecting B wavelengths is arranged, and in a GBW row, a color separation filter reflecting R wavelengths is arranged. Together with collecting light in transmissive aperture parts with lenticular lenses and improving the transmitted quantity of light, the light reflected by color separation filters is returned to the backlight and re-utilized.

13 Claims, 8 Drawing Sheets

LIQUID CRYSTAL DISPLAY DEVICE

BACKGROUND OF THE INVENTION

The present invention pertains to a liquid crystal display device using reflective type or transflective type liquid crystals.

In JP-A-9-197392, there is disclosed a liquid crystal display device characterized in that: it is provided with a first substrate arranged on the incident light side, a second substrate arranged facing the first substrate, and a liquid crystal layer sandwiched between the first substrate and the second substrate; it includes a first color filter layer consisting of an organic material and a second color filter layer consisting of a dielectric multilayered film; and that a microlens array substrate, on which a microlens array is arranged for each pixel, is bonded to the substrate on which the second color filter layer is formed and collects the incident light in an aperture part by means of the microlens arrays.

In JP-A-2002-189216, there is disclosed an electro-optical device characterized by having a light source means, a hologram color filter, a microlens array in which a plurality of microlenses are arranged, and a liquid crystal panel of the half transmissive and half reflective type; and concentrating light from a point light source, separated into its spectral components by means of the hologram color filter, into a translucent window part by means of the microlens array.

The liquid crystal display device of JP-A-9-197392 is characterized in that a second color filter layer having high resistance to light is provided between the microlens arrays and the liquid crystal layer in order to prevent the degradation of a first color filter layer and is devised so that, by reducing in particular the transmittance on the short wavelength side, short wavelength light is not irradiated on the green and red first color filter layer. For that reason, the result is that, by providing a microlens array, it becomes possible to collect, with high efficiency, the incident light in an aperture part via the second color filter layer, but this is equivalent to the case in which, regarding the quantity of light transmitted through the liquid crystal display device, the second color filter layer is not provided.

In JP-A-2002-189216, red, green, and blue light components, emitted from a light source means, are separated spectrally by means of a hologram color filter in order to further raise the light utilization efficiency, and are made to be collected in aperture parts corresponding to each spectrally separated red, green, and blue light component. However, since light from a plurality of microlens arrays is transmitted from one aperture, the angular distribution of light emitted from the aperture becomes discrete, so there is the concern that, depending on the angle from which the display is viewed at the time of viewing, the change in brightness is great and display quality degrades. Also, since the light coming from a plurality of microlens arrays is made to be transmitted from one aperture, there is a need to align the apertures of the liquid crystal panel, the microlens arrays, and the apertures provided at the light source with extremely high accuracy, so it is considered that there is a problem of assembly being difficult.

As mentioned above, if one tries to improve the utilization efficiency of light transmitted through the aperture part of a liquid crystal display device, in particular in the case of trying to improve the light utilization efficiency by reducing the light absorption of color filters, there has been the issue that the structure becomes complex or that display quality is degraded.

SUMMARY OF THE INVENTION

The problem to be solved by the present invention is to furnish a liquid crystal display device in which, with a simple structure and without degrading the display quality, the light utilization efficiency has been improved.

The present invention is characterized in that: in a liquid crystal display device having a liquid crystal display element having color filters, arranged for each subpixel obtained by pixel partitioning, and transmissive aperture parts, provided on the substrate for each of the aforementioned subpixels, and displaying an image by switching, with a voltage impressed on the liquid crystal layer, the quantity of light transmitted through the aforementioned apertures; and a backlight illuminating the aforementioned liquid crystal display element;

the device has a color separation filter having light collecting elements collecting the light from the aforementioned backlights in the aforementioned transmissive aperture parts and in which, on the side of the aforementioned backlights of aforementioned light collecting elements, the reflectance of light of wavelengths having high transmittance in the aforementioned color filter is lower than the reflectance of light of wavelengths having low transmittance in the aforementioned color filter.

As light collecting elements, it is possible to use lenticular lenses or Fresnel lenses and in addition, it is desirable to provide a polarizing plate between the aforementioned light collecting elements and the aforementioned transmissive aperture parts. As backlights, it is desirable to use backlights in which an organic film is chosen as the light emitting layer.

Also, the present invention is characterized in that: in a liquid crystal display device having a liquid crystal display element having color filters, arranged for each subpixel obtained by pixel partitioning, and transmissive aperture parts, provided on the substrate for each of the aforementioned subpixels, and displaying an image by switching, with a voltage impressed on the liquid crystal layer, the quantity of light transmitted through the aforementioned apertures; and a backlight illuminating the aforementioned liquid crystal display element;

the aforementioned subpixels have red, green, and blue display subpixels, having high transmittance for respectively red, green, and blue wavelengths, and white display subpixels having high transmittance for all visible wavelengths;

there are alternately arranged, in the row direction or the column direction of the aforementioned subpixels, a first array constituted by the aforementioned red, green, and white display subpixels and a second array constituted by the aforementioned green, blue, and white display subpixels;

and there are arranged a first color separation filter associated with the aforementioned first array and reflecting blue wavelength light more than red wavelength light and a second color separation filter associated with the aforementioned second array and reflecting red wavelength light more than blue wavelength light.

It is desirable for the area of the transmissive aperture parts provided in the green display subpixels to be greater than the areas of the red and blue display transmissive aperture parts. Also, as light collecting elements, it is desirable to choose lenticular lenses running parallel to the first array and the second array. Moreover, on the liquid crystal layer side of the substrate, there may be formed a third color separation filter reflecting green wavelength light. Also, the first color separation filter and the second color separation filter may be formed on the liquid crystal layer side of the substrate.

Further, the present invention is characterized in that: in a liquid crystal display device having a liquid crystal display element having color filters, arranged for each subpixel obtained by pixel partitioning, and transmissive aperture parts, provided on the substrate for each of the aforementioned subpixels, and displaying an image by switching, with a voltage impressed on the liquid crystal layer, the quantity of light transmitted through the aforementioned apertures; and a backlight illuminating the aforementioned liquid crystal display element;

the aforementioned subpixels have at least red, green, and blue display subpixels, having high transmittance for respectively red, green, and blue wavelengths;

there are alternately arranged, in the row direction or the column direction of the aforementioned subpixels, a first array constituted by at least the aforementioned red and blue display subpixels and a second array constituted by at least the aforementioned green display subpixels;

and there is arranged a color separation filter associated with the aforementioned first array and reflecting green wavelength light more than blue wavelength light or red wavelength light.

It is desirable for the light collecting elements to be lenticular lenses running parallel to the array directions. Also, the color separation filter may be formed on the liquid crystal layer side of the substrate. Moreover, it is possible, in addition to the red, green, and blue subpixels and compared with these subpixels, to provide fourth subpixels with higher transmittance for all visible wavelengths.

Still further, the present invention is characterized in that: in a liquid crystal display device having a liquid crystal display element having color filters, arranged for each subpixel obtained by pixel partitioning, and transmissive aperture parts, provided on the substrate for each of the aforementioned subpixels, and displaying an image by switching, with a voltage impressed on the liquid crystal layer, the quantity of light transmitted through the aforementioned apertures; and a backlight illuminating the aforementioned liquid crystal display element;

the device has light collecting elements corresponding to the aforementioned transmissive aperture parts; the light from the aforementioned backlight is collected, by means of the aforementioned light collecting elements, in the aforementioned transmissive aperture parts arranged in a zigzag shape; and the aforementioned light collecting elements are of a nearly rectangular shape.

It is desirable to choose one side of the light collecting elements to have approximately 1.5 times the length of the other side and also, it is possible to use Fresnel lenses. Moreover, it is desirable to provide one color separation filter for each subpixel. Also, it is acceptable to have a transparent component supporting the color separation filters on the backlight side of the color separation filters.

As for the liquid crystal display device of the present invention, it is possible to furnish a liquid crystal display device with improved brightness by providing color separation filters between the microlens arrays and the backlights, and reutilizing the light absorbed by the color filters in the prior art.

Other objects, features and advantages of the invention will become apparent from the following description of the embodiments of the invention taken in conjunction with the accompanying drawings.

DETAILED DESCRIPTION OF THE INVENTION

Hereinafter, the contents of the present invention will be described in detail using the drawings.

[First Embodiment]

Figure 1A:
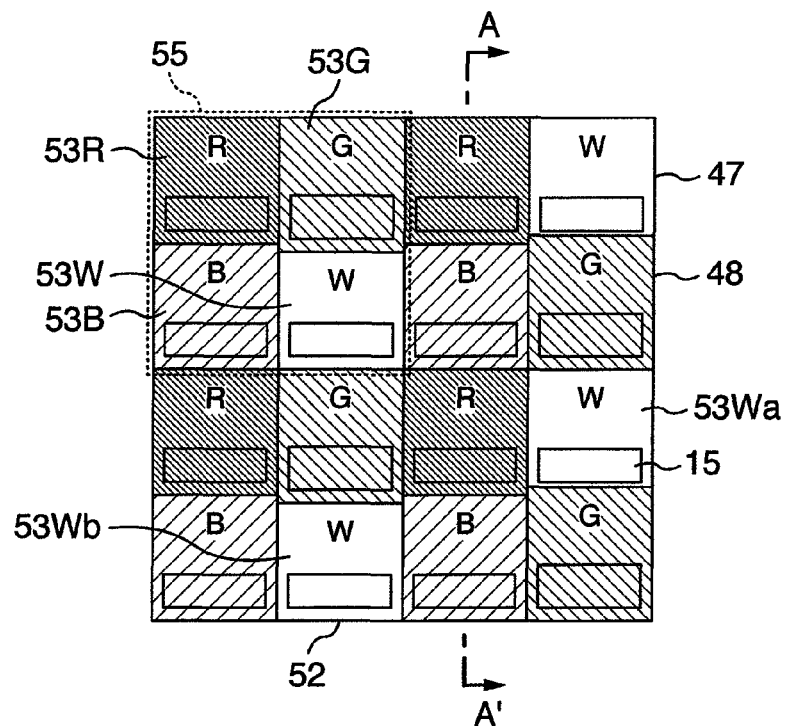
FIG. 1A is a front elevational view of a liquid crystal display device and a backlight of Embodiment 1.
Figure 1B:
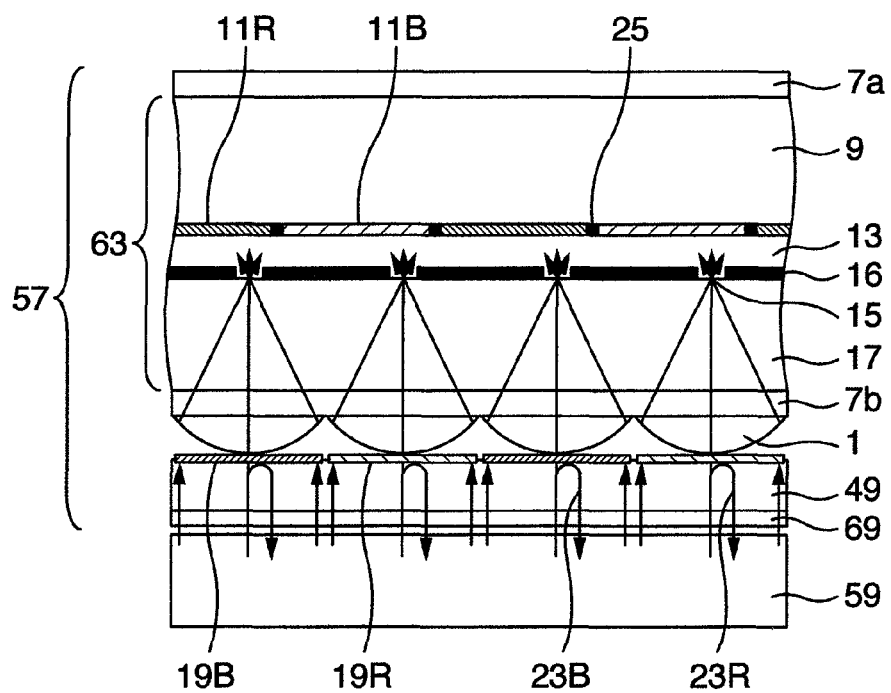
FIG. 1B is a cross-sectional view of a liquid crystal display device and a backlight of Embodiment 1.

Using FIG. 1, Embodiment 1 of the present invention will be described. FIG. 1A is a front elevational view of a liquid crystal display device and FIG. 1B is a cross-sectional view, showing a cross section taken along line A-A' of FIG. 1A, of a backlight and a liquid crystal display element constituting the liquid crystal display device. Here, a transflective type liquid crystal display element having a transmissive display part and a reflective display part is used as a liquid crystal display element 57 and a backlight 59 is used as a backlight.

One pixel 55 is constituted by four RGBW subpixels 53, the RGBW subpixels 53 being arranged with white (W) subpixels in addition to the red (R), green (G), and blue (B) subpixels, and taking subpixels 53 to be nearly rectangular. R subpixel 53R, G subpixel 53G, and B subpixel 53B are provided with color filters 11 having a desired transmission spectrum, whereas for W subpixel 53W, no color filter is provided. Between each of subpixels 53, a black matrix 25 is provided to separate color filters 11.

Here, the system was devised so that, in a GW column 52 composed of G subpixel 53G and W subpixel 53W, the positions of G subpixel 53G and W subpixel 53W are interchanged for each column and for all subpixel 53 rows, and equal proportions of G subpixel 53G and W subpixel 53W are included. As a result, regarding the row direction, RGW rows 47 including R subpixel 53R, G subpixel 53G, and W subpixel 53W, and GBW rows 48 including G subpixel 53G, B subpixel 53B, and W subpixel 53W are alternately repeated.

Associated with the row direction of these subpixels 53, there were arranged lenticular lenses 1 used as light collecting means and color separation filters 19. At this point, there were associated and arranged, in RGW row 47, a color separation filter 19B reflecting (reflected light beam 23B) B wavelengths and transmitting the remaining G and R wavelengths, and in GBW row 48, a color separation filter 19R reflecting (reflected light beam 23R) R wavelengths and transmitting the remaining B and G wavelengths. As a result, in RGW row 47, the B wavelength light absorbed by R subpixel 53R and G subpixel 53G is reflected by color separation filter 19B and returned to backlight 59, and similarly in GBW row 48, the R wavelength light absorbed by G subpixel 53G and B subpixel 53B is reflected by color separation filter 19R and returned to backlight 59.

In this way, even if color separation filter 19R and color separation filter 19B are provided across subpixels with different colors, it becomes possible to make light incident on R subpixel 53R, G subpixel 53G, and B subpixel 53B at wavelengths having high transmittance at the respective subpixels 53. The light returning to backlight 59 is reflected within backlight 59, a part thereof being again emitted to the liquid crystal display element 57 side and reutilized. As a result, in case color separation filter 19 is not provided, it becomes possible to reutilize the light which is absorbed in color filter 11 and unutilized, so the light utilization efficiency can be improved.

Using FIG. 1B, the progress of the light beams occurring in the liquid crystal display device will be described. A light beam coming from a light source (not illustrated) provided in backlight 59 is emitted from the emitting face of backlight 59. In a reflective type polarizing plate 69, the polarized light in the direction absorbed by polarizing plate 7b is reflected and the polarized light in the direction transmitted by polarization plate 7b is mainly transmitted. The light beam transmitted through reflective type polarizing plate 69 is reflected in part by color separation filter 19B or color separation filter 19R, the rest being transmitted. Here, reflective type polarizing plate 69 and color separation filter 19 are provided on a filter substrate 49.

The light transmitted through color separation filter 19 is collected in a uniaxial direction by means of lenticular lenses 1 extending in a direction perpendicular to the page. A light beam collected by means of a lenticular lens 1 is collected in transmissive aperture part 15 via polarizing plate 7b and a lower side substrate 17 of liquid crystal display element 57 and is transmitted through a transmissive aperture part 15 with high efficiency. The light beam transmitted through transmissive aperture part 15 is transmitted through a liquid crystal layer 13, a color filter 11, an upper substrate 9, and a polarizing plate 7a and, depending on the voltage impressed on liquid crystal layer 13, the transmittance is switched and an image is displayed. Further, by providing a reflective display part 16, a transflective liquid crystal display device can be adopted. The configuration of this liquid crystal module 63 may be taken to be the same as a normally used transflective type liquid crystal module and in the case of an active matrix drive, there may be provided a thin film transistor (TFT) for reflective display part 16.

After being formed on top of the face of the liquid crystal side of filter substrate 49, color separation filters 19 were aligned with lenticular lenses 1 and pasted together with and fastened to liquid crystal module 63. Subsequently, reflective type polarizing plate 69 was pasted to the backlight side of filter substrate 49. Lenticular lenses 1 were aligned to transmissive aperture parts 15 and were formed by means of inkjet or offset printing at the desired positions on top of polarizing plate 7b. Apart from these printing based preparation methods, the lenses may be formed by means of the 2P (Photo Polymer) method of forming polymer material lenses using a metal mold, or the hot melt method in which lens shapes are chosen after patterning a photoresist using a photolithography technique and applying heat thereto.

In the present embodiment, lenticular lenses 1 were formed on polarizing plate 7b, but lenticular lenses 1 may also be formed directly on lower substrate 17. In this case, it is desirable to provide polarizing plate 7b on the liquid crystal module 63 side with respect to reflective type polarizing plate 69 and it is desirable to provide it between reflective type polarizing plate 69 and filter substrate 49 or between color separation filters 19 and lenticular lenses 1. However, if polarizing plate 7b is provided more on the liquid crystal panel side than color separation filters 19, it does not occur that the light reflected by color separation filter 19 is absorbed by polarizing plate 7b and is lost, so in order to improve the light reutilization efficiency, it is desirable to provide polarizing plate 7b, as in the present embodiment, more on the liquid crystal panel side than color separation filters 19. Also, lenticular lenses 1 may be formed on color separation filters 19.

For color separation filters 19, there was used a dielectric multi-layered film formed by laminating dielectric films with different refractive indices. Depending on the type, film thickness, and number of laminated layers of the dielectric, it is possible to prepare color separation filters 19 with hardly any light absorption. As the dielectric material, it is possible to use SiN, AlN, $TiO_2$, $ZrO_2$, $Ta_2O_5$, and the like, as high refractive index materials and $SiO_2$, $MgF_2$, $Al_2O_3$, and the like, as low refractive index materials. It is desirable to take color separation filter 19B to have the structure of a filter transmitting at long wavelengths and also, it is desirable to take color separation filter 19R to have the structure of a filter transmitting at short wavelengths. These color separation filters 19 were patterned using a photolithography method or a liftoff method in order that their axes become the desired ones matching the axes of subpixels 53.

When the wavelength of the border line, at which there is a change from wavelengths with high transmittance to wavelengths with high reflectance, is taken to be $\lambda$, the refractive index of the high refractive index material is taken to be $n_H$, and the refractive index of the low refractive index material is taken to be $n_L$, and if $H=\lambda/4n_H$ and the low refractive index material $L=\lambda/4n_L$, it is desirable to choose a $(0.5H\ L\ 0.5H)^s$ structure in the case of a high-pass filter and a $(0.5\ L\ H\ 0.5\ L)^s$ structure in the case of a low-pass filter. Note, however, that s indicates the number of times of repetition, so the number of layers becomes $2s+1$. As for the film thickness of these layers, the film thickness of each layer may, based on the aforementioned structure, be micro-adjusted so that the desired transmission spectrum can be obtained. The more the number s of times of repetition is increased, the steeper is the transmission spectrum obtained, but in the present embodiment, there is no need, in order to be able to cut unnecessary wavelength light to increase color saturation in color filter 11, to strictly separate the transmission and reflection spectra in color separation filter 19, so it is acceptable to choose the number of layers to be 7 or greater, and desirably, 11 or greater.

Color separation filters 19 are filters that are provided to return the light having a wavelength absorbed in color filters 11 to backlight 59 and reutilize the light in order to improve the brightness, so, to the extent that a brightness improvement effect is obtained, the light having wavelengths absorbed in color filters 11 may be reflected. Also, the transmission spectrum of color filters 11 may also be determined taking into account the transmission spectrum of color separation filters 19.

In the present embodiment, no color filter is provided for W subpixel 53W, but W subpixel 53Wa turns into the complementary color yellow (Y) in order that the light having wavelengths separated by color separation filter 19B be incident, while W subpixel 53Wb turns into the complementary color cyan (C) in order that the light having wavelengths separated by color separation filter 19R be incident. In this way, it becomes possible, without adding to color filters 11, to also provide Y and C subpixels 53, so there is also the effect of widening the color domain. Taking into account as well the effect of W subpixel 53W serving as these Y and C subpixels, it is desirable to convert the image data so that an image with the desired colors is displayed.

In the present embodiment, color separation filters 19 were formed on top of filter substrate 49, but they may also be formed on top of lenticular lenses 1. In the present embodiment, it is possible, by means of the light recycling effect due to the fact of providing color separation filter 19B and 19R, to improve B and R brightness without increasing the electric power consumption of the light source. In the present embodiment, the area of G subpixel 53G was made greater than those of R subpixel 53R and B subpixel 53B, and the area of adjacent W subpixel 53W was reduced in order further to improve the G brightness. In agreement therewith, the device was devised so that the transmittance becomes greater by making transmissive aperture part 15 of G subpixel 53G greater than transmissive aperture parts 15 of R subpixel 53R and B subpixel 53B.

In order to improve the brightness of G, the G wavelength component may be made stronger in the spectral distribution of the light source. Alternatively, in the present embodiment, there may, with W subpixel 53W being chosen, be provided a G wavelength pass color filter having higher transmittance than G subpixel 53G.

In order to raise the quantity of light transmitted through transmissive aperture parts 15, a function carried out by lenticular lenses 1, being light collecting elements, it is desirable for the directivity of the emitted light from backlight 59 to have high directivity in the direction in which lenticular lenses 1 collect light, and it is necessary to take the spreading angle in this direction to be at most ±7°, and desirably, ±5°. Further, as the angle of normal brightness field of vision (the spreading angle), there is generally used the angle at which the brightness becomes half with respect to the peak brightness, so the viewing angle (spreading angle) may be determined in accordance herewith.

Figure 4:
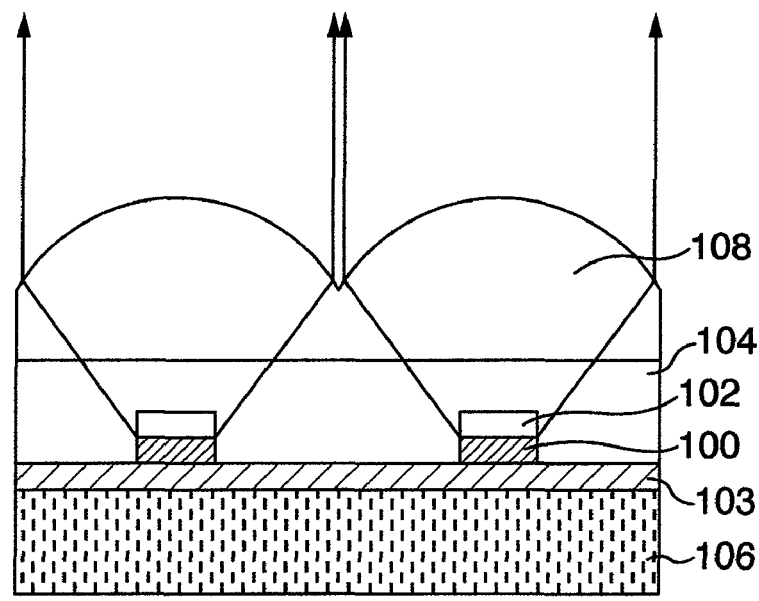
FIG. 4 is a cross-sectional view of a light emitting element applied to the liquid crystal display device of Embodiment 1.

In FIG. 4, there is shown a cross-sectional view of a backlight suitable for the present embodiment. Here, an organic light emitting diode (OLED) is used for the light emitting layer, and there is used an OLED backlight with a top emission structure extracting light in a direction away from substrate 106. On top of OLED substrate 106, there was formed a metal electrode 103 and there were formed, in a stripe shape, a light emitting layer 100 and a transparent electrode 102 provided on the light extraction side. Light emitting layer 100 was sealed by means of a sealant layer 104 using a transparent sealant film. Subsequently, lenticular lenses 108 were formed in parallel with light emitting layer 100 on top of sealant layer 104. By devising the system so that light emitting layer 100 comes in the vicinity of the focus of lenticular lenses 108, the directivity of a light beam emitted from light emitting layer 100 is improved, so it is possible to obtain emitted light with high directivity, close to parallel light. Further, by using a metal electrode 103 with high reflectance, it is possible to reflect, with high efficiency, the light returning form lenticular lens 108 side to the backlight, and the reutilization efficiency can be raised.

As for light emitting layer 100, it is desirable to adjust it to the pitch of lenticular lenses 1 on the side of liquid crystal display element 57 and align it with lenticular lenses 1 and lenticular lenses 108. Alternatively, it is desirable to devise the system so that the pitch of light emitting layer 100 is made smaller than the pitch of lenticular lenses 1 and that a plurality of light emitting layers 100 fit into one width of lenticular lenses 1. Further, in order to improve the directivity of the backlight for all directions, it is acceptable to arrange light emitting layer 100 in a point-like manner and improve the directivity using spherical lenses. Also, the OLEDs may also be taken to have bottom emission, and in that case, it is acceptable to take substrate 106 to be transparent and form microlenses on top of substrate 106.

In this way, it is possible, by using an OLED backlight, to obtain a backlight with high directivity and high light recycling efficiency. In case an OLED backlight is used, the proportion of daylight transmitted through transmissive aperture parts 15 and incident on the backlight is high, since the light reutilization efficiency of the backlight is high. As a result, the reflectance at the time of reflective display also becomes high.

However, backlight 59 is not anything limited to an OLED backlight, it being acceptable to take a backlight using a LED or a cold cathode fluorescent lamp (CCFL) as the light source or a backlight having the desired directivity with respect to lenticular lenses 1, the light collecting means. Further, it is desirable to use a backlight with high light reutilization efficiency.

In the liquid crystal display device of the present embodiment, the viewing angle in the direction in which light is collected by lenticular lenses 1 depends mostly on the thickness of lower substrate 17, and if the substrate thickness of lower substrate 17 is reduced, it is possible to increase the quantity of light transmitted through transmissive aperture part 15 and the viewing angle can be widened. Moreover, if the substrate of lower substrate 17 is made thicker, the viewing angle becomes narrower, but the frontal brightness becomes higher. In order that the desired display characteristics, including the viewing angle, can be obtained, it is desirable to determine the thickness of lower substrate 17. E.g., in order to choose the viewing angle to be ±12° or greater, it is desirable to take the combined thickness of lower substrate 17 and polarizing plate 7b to be equal to or smaller than 400 µm in case the width of lenticular lenses 1 is 150 µm and to be equal to or smaller than 200 µm in case the width of lenticular lenses 1 is 75 µm.

In order to collect light in transmissive aperture parts 15 with high efficiency, it is desirable to choose lenticular lenses 1 to be aspherical lenses. In particular, in case lower substrate 17 becomes thin and the radius of curvature of lenticular lenses 1 becomes small, it is effective to use aspherical lenses. However, even if spherical lenses are chosen, it is not necessarily required to choose aspherical lenses in case sufficient light collection performance can be obtained. Also, if the curvature of the central part of a lenticular lens 1 is relaxed to become close to flat, the fact that the frontal brightness of a light beam transmitted through transmissive aperture part 15 becomes higher is known and can be applied to the present embodiment as well.

If the width, height, and curvature of lenticular lenses 1 are modulated randomly, a light scattering function can be provided. If the width and the height of lenticular lenses 1 are modulated with the curvature maintained, the focal distance does not change and it is possible to confer light scattering ability regarding a direction which is perpendicular to the light collection direction of lenticular lenses 1, something that is particularly desirable.

It is acceptable to coat lenticular lenses 1 with a material having a different refractive index and embed them, so that the surface of lenticular lenses 1 becomes plane. In this case, it is desirable for the refractive index of lenticular lenses 1 to be high, it being possible to implement the high refractive index material by blending microparticles of a high refractive index inorganic material like $TiO_2$ into a polymer.

In the present embodiment, it is possible to make the lens width 1.5 times greater than the arrangement of juxtaposed RGB subpixels having the same resolution. At this point, the thickness of lower substrate 17 with which the same viewing angle can be obtained is also increased 1.5 times. As a result, even in the case of using liquid crystal module 63 with a high resolution and a small pixel pitch, it is possible to ensure the strength of lower substrate 17, the result being that, in addition, a polarizing plate 7b can be provided between lenticular lenses 1 and lower substrate 17.

The viewing angle in the longitudinal direction of lenticular lenses 1 is determined by means of the viewing angle of the emitted light from the backlight. As a result, by using a backlight with a wide viewing angle in the longitudinal direction of lenticular lenses 1, it is possible to widen the viewing angle in the longitudinal direction of lenticular lenses 1. If one takes into account the parallax of two eyes, it is desirable that the viewing angle in the left right direction be wider, so as a result, it is desirable that lenticular lenses 1 be well arranged in the left right direction in case of viewing the liquid crystal display device.

In the present embodiment, a phase retarder (not illustrated) was incorporated in the reflective display part on the liquid crystal layer 13 side and there was used the IPS mode (In Plane Switching) display mode using a linearly polarizing plate transmitting linearly polarized light as polarizing plate 7. The display mode of liquid crystal module 63 is not one limited to IPS, it being possible to use, without any particular limitation, a mode such as TN (Twisted Nematic) or VA (Vertical Alignment). In the case of a transflective display mode necessitating a circular polarizer, polarizing plate 7b may be taken to be a circular polarizer. However, in the case of a display mode not necessitating a circular polarizer, it is possible, and desirable, to further increase the light reutilization rate by raising the reflectance of the back face of reflective display part 16 so that a light beam reflected by the back face of reflective display part 16 is transmitted through polarizing plate 7b and returns to the backlight 59 side.

In case the backlight has high directivity for all directions, it is possible to widen the viewing angle by providing a hologram sheet, a lenticular lens sheet, or a prism sheet on the light emission side rather than on liquid crystal layer 13 of liquid crystal module 63. Alternatively, it is acceptable to provide, between backlight 59 and liquid crystal display element 57, a hologram sheet, a lenticular lens sheet, or a prism sheet to widen the uniaxial direction spreading angle.

Color separation filters 19 using a dielectric multi-layered film have a transmission spectrum that generally changes as a function of the incident angle, so, depending on the angle of viewing, a color change occurs. However, since, in the present embodiment, a light beam collected in transmissive aperture part 15 by means of lenticular lenses 1 is a light beam with close to perpendicular incidence on color separation filter 19, a change in the incident angle of the light beam toward color separation filter 19 is small, so the color change is small. Further, since a light beam incident on color separation filter 19 at a different angle by means of lenticular lenses 1 is emitted in the same direction, the color changes are averaged, so there is the effect that color changes due to the angle of viewing become small.

Also, since color separation filters 19 were formed on top of a separate filter substrate 49, it is easy to prepare a color separation filter 19 having the desired performance. Also, reflective type polarizing plate 69 need not necessarily be provided, but in case it is provided, as shown in the present embodiment, providing it on the backlight 59 side rather than on lenticular lenses 1 enables a greater light recycling efficiency and is desirable. Moreover, in case the backlight is polarized, a phase retarder (a λ/2 plate) rotating the polarization direction so as to fit with the transmission axis of polarizing plate 7b may be provided on the backlight side of reflective type polarizing plate 69, or it may be provided instead of reflective type polarizing plate 69.

Again in the present embodiment, a description was given taking color filters 11 not to be provided on W subpixel 53W, but there may be provided a color filter with a transmission spectrum that is different from those of color filter 11R, color filter 11G, and color filter 11B, or there may be provided a color filter being the same as color filter 11G.

[Second Enbodiment]

Figure 2:
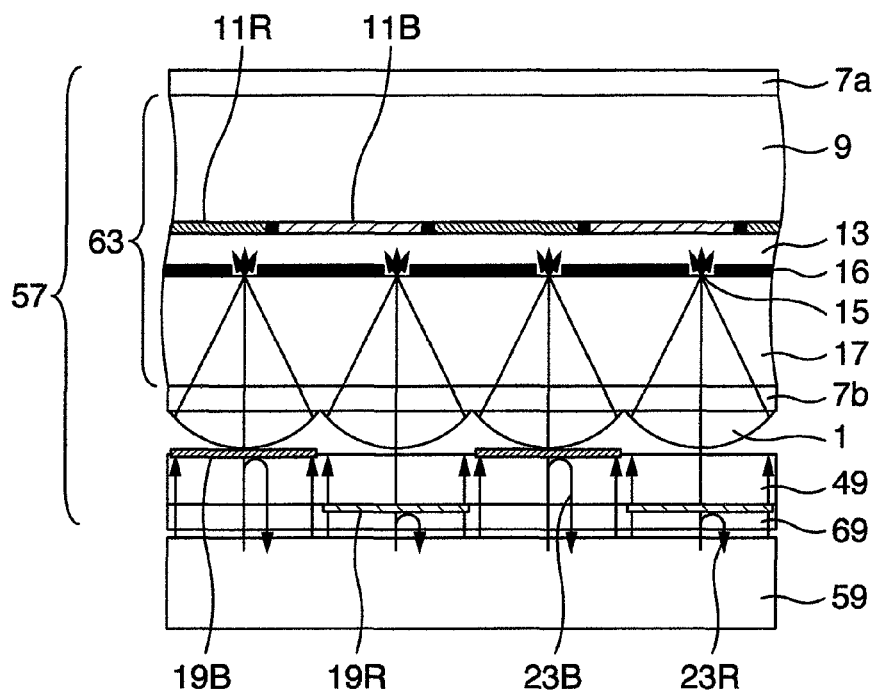
FIG. 2 is cross-sectional view of a liquid crystal display device and a backlight of Embodiment 2.

Using FIG. 2, Embodiment 2 of the present invention will be described. FIG. 2 is a cross-sectional view of a backlight and a liquid crystal display element constituting the liquid crystal display device, a cross section taken along line A-A' of FIG. 1A being shown. Since only the arrangement of color separation filter 19 differs from Embodiment 1, the description will be given regarding the points of difference.

In the present embodiment, color separation filter 19B and color separation filter 19R were formed by splitting them off to separate faces of filter substrate 49. In the present embodiment, after forming color separation filter 19B and color separation filter 19R on top of filter substrate 49, they were patterned together. In case the pattern was exposed to light, the exposure was carried out by adjusting the positions so that the color separation filter 19 intervals had the desired positional relationships.

In this way, by forming two kinds of color separation filters 19 by splitting them off to both faces of filter substrate 49, it is possible to form color separation filters 19 discretely and since patterning is possible with one etching process, preparation becomes easy. Since a light beam transmitted through color separation filter 19R provided on the backlight 59 side of filter substrate 49 is incident on lenticular lenses 1 that respond with high efficiency, it is desirable for filter substrate 49 to be thin, it being desirable to choose the substrate thickness to be equal to or smaller than the subpixel width.

[Third Embodiment]

Figure 3:
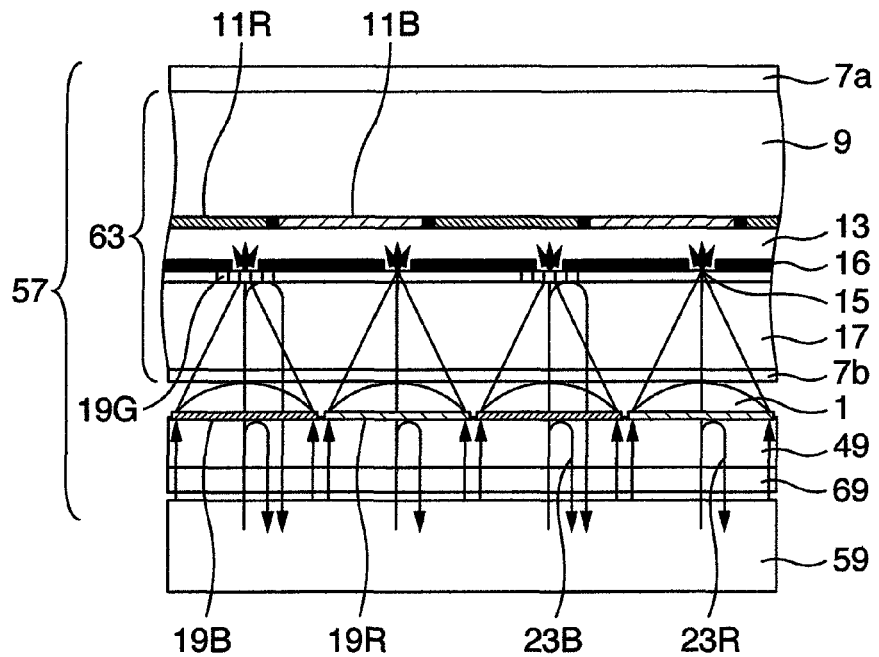
FIG. 3 is cross-sectional view of a liquid crystal display device and a backlight of Embodiment 3.

Using FIG. 3, Embodiment 3 of the present invention will be described. FIG. 3 is a cross-sectional view of a backlight and a liquid crystal display element constituting an liquid crystal display device, showing a cross section taken along line A-A' of FIG. 1A. A description will be given regarding the points of difference with Embodiment 1.

In the present embodiment, there was provided a color separation filter 19G reflecting G wavelength light to transmissive aperture parts 15 of R subpixel 53R and B subpixel 53B. Color separation filter 19G was formed on the liquid crystal layer 13 side of lower substrate 17. Since a light beam reflected by color separation filter 19G can return to the backlight 59 side and a part thereof once again be transmitted through lenticular lens 1 and reutilized, it is possible to further raise the light utilization efficiency.

A color separation filter 19 reflecting a specific wavelength can be obtained by laminating a high refractive index material and a low refractive index material in which there occurs a λ/4 optical path length at the desired wavelength λ.

In the present embodiment, lenticular lenses 1 were formed on top of color separation filters 19. By using a highly heat resistant material for filter substrate 49 and color separation filters 19, it is possible to form lenticular lenses 1 by the hot melt method etc. and heating.

[Fourth Embodiment]

Figure 5:
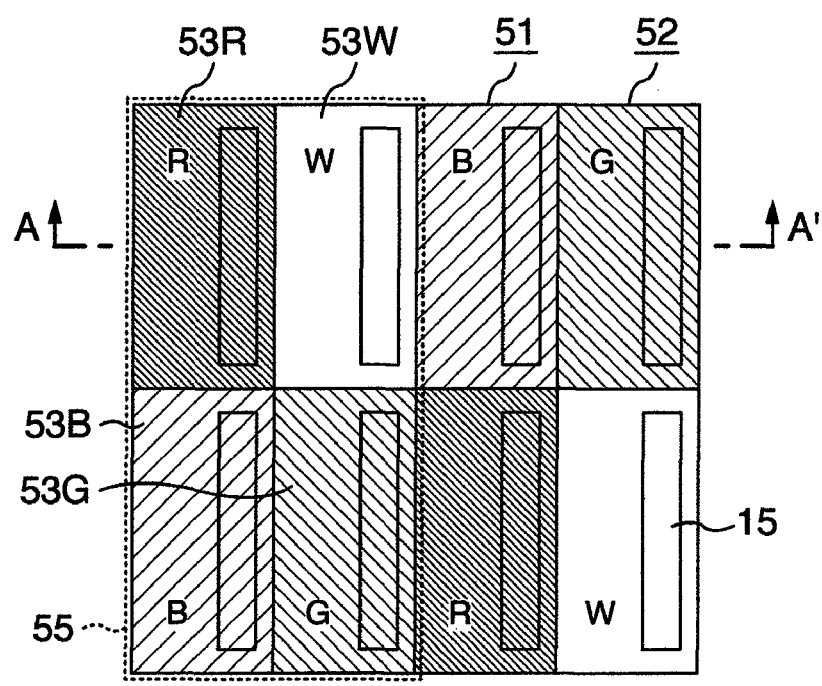
FIG. 5 is a front elevational view of the liquid crystal display device of Embodiment 4.
Figure 6:
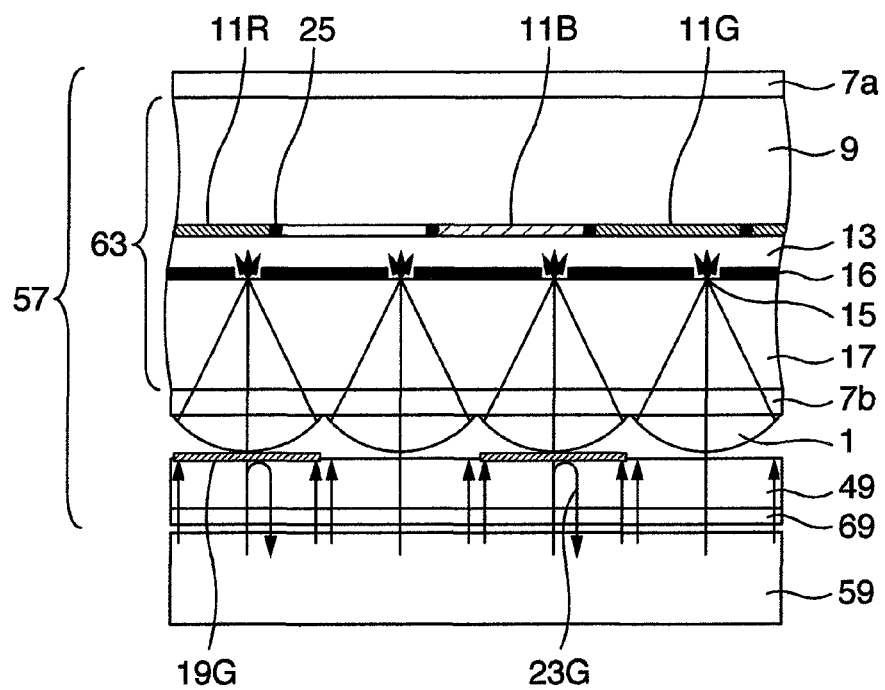
FIG. 6 is a cross-sectional view of the liquid crystal display device and backlight of Embodiment 4.

Using FIG. 5 and FIG. 6, Embodiment 4 of the present invention will be described. FIG. 5 shows a front elevational view of a liquid crystal display device and FIG. 6 is a cross-sectional view of a backlight and a liquid crystal display element constituting a liquid crystal display device, showing a cross section taken along line A-A' of FIG. 5.

When it comes to subpixels 53, there are arranged RGBW subpixels 53 with white (W) added together with red (R), green (G), and blue (B), one pixel 55 being constituted by four RGBW subpixels 53. Each subpixel 53 has a vertical length taken to be twice the horizontal length. Here, within a row of horizontally lined up subpixels, there is used an arrangement in which RGBW subpixels 53 are included. In the column direction of subpixels 53 (the vertical direction of FIG. 5), an RB column 51, including only R subpixel 53R and B subpixel 53B, and a GW column 52, including only G subpixel 53G and W subpixel 53W, are arranged alternately.

Lenticular lenses 1 associated with RB column 51 and GW column 52 are arranged and, associated with RB column 51, there was arranged a color separation filter 19G reflecting G wavelength light. In RB column 51, G wavelength light is reflected and returns to backlight 59, is reflected by backlight 59 and is once again emitted to the liquid crystal display element 57 side and reutilized. As a result, in case color separation filters 19 are not provided, it is possible to improve the utilization efficiency of G wavelength light that is absorbed by color filter 11R and color filter 11B and not utilized. In GW column 52, since color separation filters 19 are not provided, white light, in which G wavelength light is largely included, is incident.

As for a light beam emitted from backlight 59, in reflective type polarizing plate 69, polarized light of the direction absorbed by polarizing plate 7b is reflected and polarized light of the direction transmitted through polarizing plate 7b is transmitted. As for a light beam transmitted through reflective type polarizing plate 69, a part thereof is reflected in color separation filter 19G and returns to the side of backlight 59. Here, reflective type polarizing plate 69 and color separation filters 19 are provided on top of filter substrate 49. Subsequently, the light is collected in a uniaxial direction by means of lenticular lenses 1 extending in a direction perpendicular to the page.

A light beam collected by means of lenticular lenses 1 passes through polarizing plate 7b and substrate 17 on the lower side of liquid crystal display element 57, is collected in transmissive aperture parts 15, and transmitted through transmissive aperture parts 15 with high efficiency. By providing lenticular lenses 1, it is possible to make it be transmitted through transmissive aperture parts 15 with high efficiency. The light beam transmitted through transmissive aperture parts 15 gets transmitted through liquid crystal layer 13, color filter 11, upper substrate 9, and polarizing plate 7a, the transmittance is switched depending on a voltage impressed on liquid crystal layer 13, and an image is displayed.

In the present embodiment, only G wavelength light is reutilized, but since G wavelength light, which has high visual sensitivity, is reutilized, the brightness improvement effect is high, even if one type of color separation filter 19 is used.

In the filter arrangement used in the present embodiment, compared to the case where the common RGB subpixels are arranged in juxtaposition, it is possible make the horizontal width of the subpixels 1.5 times larger with the same resolution. As a result, even in the case of using a liquid crystal module 63 with a small pixel pitch at a high resolution, it is possible to ensure the strength of the substrate since lower substrate 17 can be made thicker and also, polarizing plate 7b can be provided between lenticular lenses 1 and lower substrate 17. Moreover, since lenticular lenses 1 are arranged to be long in the vertical (top bottom) direction, the viewing angle in the vertical direction of FIG. 5 can be determined with the emission distribution from the backlight.

[Fifth Embodiment]

Figure 7:
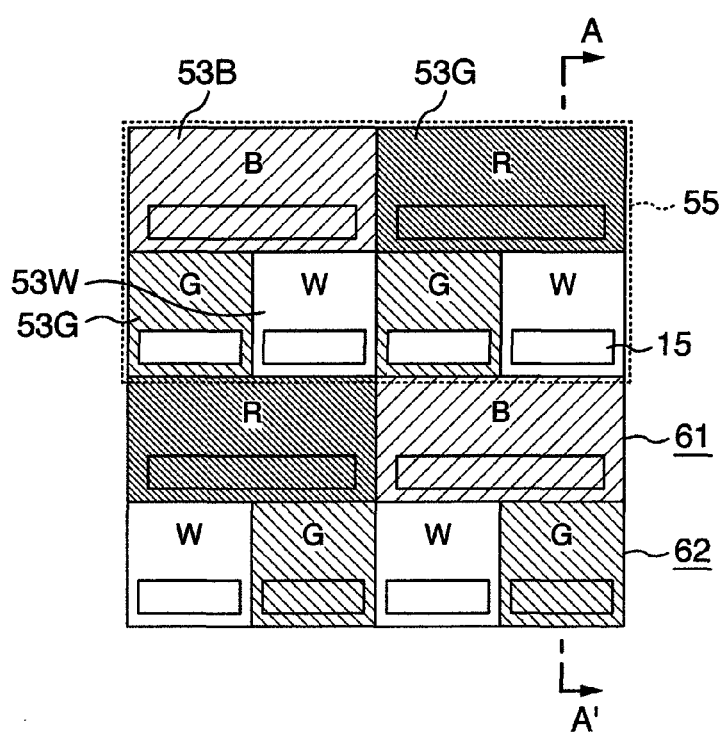
FIG. 7 is a front elevational view of the liquid crystal display device of Embodiment 5.

Using FIG. 7, Embodiment 5 of the present invention will be described. FIG. 7 shows a front elevational view of a liquid crystal display device. The cross section along line A-A' is the same as in FIG. 6. In the present embodiment, together with rotating the FIG. 5 color filter 90°, G subpixel 53G and W subpixel 53W were divided in half.

Here, there is used an arrangement in which RGBW subpixels 53 are included within the column of subpixels lined up vertically. In the row direction (the horizontal direction of FIG. 7) of subpixels 53, RB rows 61, including only R subpixel 53R and B subpixel 53B, and GW rows 62, including only G subpixel 53G and W subpixel 53W, are arranged alternately. Lenticular lenses 1 and color separation filters 19 were arranged in the row direction (the horizontal direction of FIG. 7) of subpixels 53 and color separation filter 19G reflecting G wavelength light was arranged to be associated with RB row 61. In RB row 61, G wavelength light is reflected, returns to backlight 59, a part from the light returning to backlight 59 is reflected by backlight 59, once again emitted to the liquid crystal display element 57 side and reutilized. As a result, in case color separation filters 19 are not provided, it is possible to improve the utilization efficiency of the light that is absorbed by color filter 11R and color filter 11B and not utilized. Since color separation filters 19 are not provided in GW row 62, white light, in which G wavelength components are largely included, is incident.

The viewing angle in the top bottom direction in which light is collected by lenticular lenses 1 is mainly determined by means of the thickness of lower substrate 17, and the viewing angle in the left right direction is determined by means of the viewing angle of backlight 59. For that reason, the result is that, by arranging lenticular lenses 1 well in the left right direction, the viewing angle in the left right direction (horizontal direction) is determined by the viewing angle of backlight 59, making it possible to widen the viewing angle in the left right direction.

[Sixth Embodiment]

Figure 8:
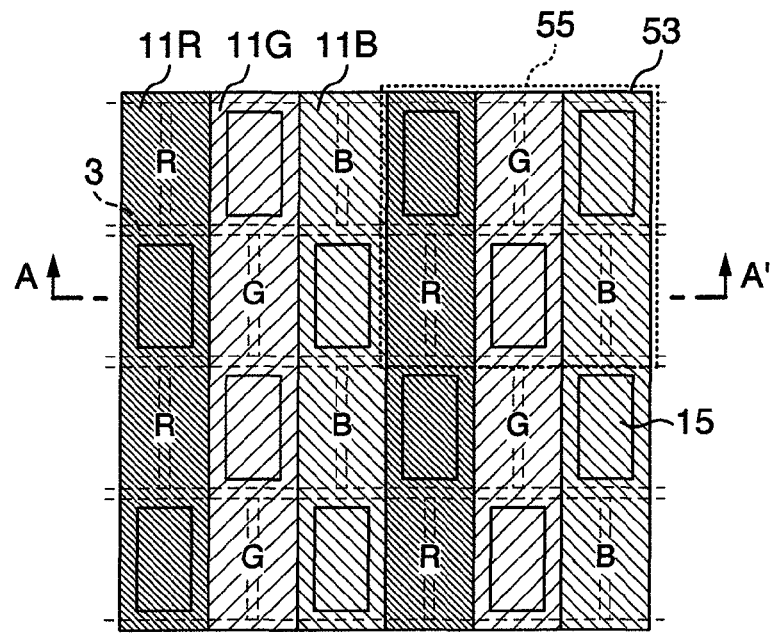
FIG. 8 is a front elevational view of the liquid crystal display device of Embodiment 6.
Figure 9:
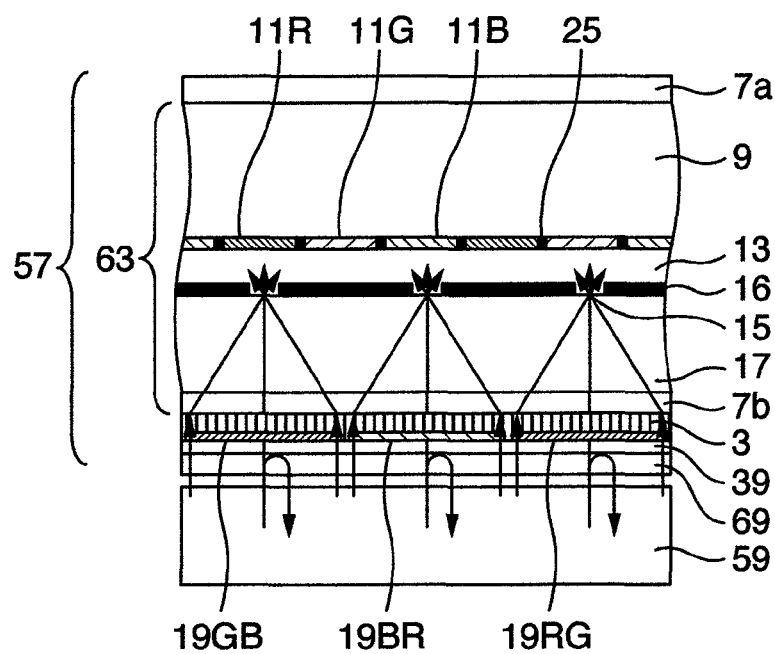
FIG. 9 is a cross-sectional view of the liquid crystal display device and the backlight of Embodiment 6.

Using FIG. 8 to FIG. 11, Embodiment 6 of the present invention will be described. FIG. 8 is a front elevational view of a liquid crystal display device and FIG. 9 is a cross-sectional view of a backlight and a liquid crystal display element constituting the liquid crystal display device, showing a cross section taken along line A-A' of FIG. 8. A transflective liquid crystal display element 57 is used.

In the present embodiment, nearly rectangular pixels 55 are divided in three, red (R), green (G), and blue (B) subpixels 53 being arranged. Transmissive aperture parts 15 provided for each subpixel 53 were arranged in zigzag shape, a so-called delta arrangement being chosen. Associated with transmissive aperture parts 15, Fresnel lenses 3 and color separation filters 19 were arranged. Color separation filters 19 correspond to each subpixel 53 and have the characteristics of transmitting wavelengths for which color filters 11 have high transmittance and reflecting the light of wavelengths for which color filters 11 have low transmittance. In other words, there were arranged color separation filter 19GB, transmitting R wavelengths and reflecting light of short wavelengths, for R subpixel 53R; color separation filter 19BR, transmitting G wavelengths and reflecting light of R wavelengths and B wavelengths, for G subpixel 53G; and color separation filter 19RG, transmitting B wavelengths and reflecting long wavelength light, for B subpixel 53B.

The light reflected by color separation filter 19 returns to backlight 59, is reflected by backlight 59 and a part thereof is once again emitted to the liquid crystal display element 57 side and is reutilized. As a result, in case color separation filters 19 are not provided, it is possible to improve the utilization efficiency of light that is absorbed by color filters 11 and not utilized.

Using FIG. 9, a description will be given of the progress of light beams in the liquid crystal display device. As for a light beam emitted from backlight 59, in reflective type polarizing plate 69, polarized light in the direction absorbed by polarizing plate 7b is reflected, and polarized light in the direction transmitted by polarizing plate 7b is transmitted. The light beam transmitted through reflective type polarizing plate 69 is reflected in part by color separation filter 19GB, or color separation filter 19BR, or color separation filter 19RG, the remainder being transmitted. Here, reflective type polarizing plate 69 and color separation filters 19 are provided on top of a film 39, film 39 being taken to be a transparent substrate. The light transmitted through color separation filters 19 is collected by means of Fresnel lenses 3 so as to be transmitted with high efficiency through transmissive aperture parts 15.

The light collected by means of Fresnel lenses 3 is transmitted through polarizing plate 7b and lower side substrate 17 of liquid crystal display element 57 and is transmitted with high efficiency through transmissive aperture parts 15. A light beam transmitted through transmissive aperture parts 15 is transmitted through liquid crystal layer 13, color filter 11, upper substrate 9, and polarizing plate 7a, the transmittance being switched dependent on a voltage impressed on liquid crystal layer 13 and an image being displayed. By providing reflective display part 16, it is possible to take the device to be a transflective liquid crystal display device. The structure of this liquid crystal display element 57 may be chosen to be the same as for commonly used transflective type liquid crystal display elements.

Figure 10:
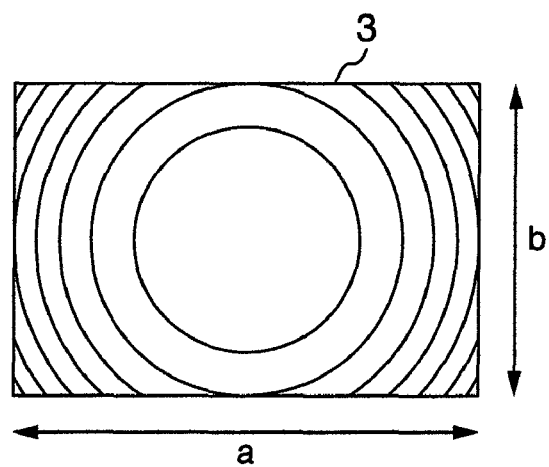
FIG. 10 is a front elevational view of a Fresnel lens of Embodiment 6.

In FIG. 10, a front elevational view of Fresnel lens 3 is shown. As for Fresnel lens 3, grooves are formed concentrically, the focal distance is determined by the groove pitch, and the light collection efficiency due to Fresnel lens 3 is determined by the groove depth and the groove shape. Here, Fresnel lens 3 was taken to be rectangular and the external size of Fresnel lens 3 was determined so as to be arranged densely, associated with transmissive aperture parts 15 in delta arrangement. In other words, the horizontal size a of Fresnel lens 3 was taken to be 4/3 of the vertical size b and, when taking the pitch of pixel 55 to be p, the horizontal size of Fresnel lens 3 was taken to be approximately 2p/3 and the vertical size was taken to be approximately p/2. In this way, by making the lens size a in the horizontal direction greater than the vertical lens size b, it is possible to widen the viewing angle in the horizontal direction. In a liquid crystal display device, this horizontal direction is chosen to become the left right direction, but it is possible, and desirable, to widen the viewing angle even with respect to the parallax of two eyes.

Figure 11:
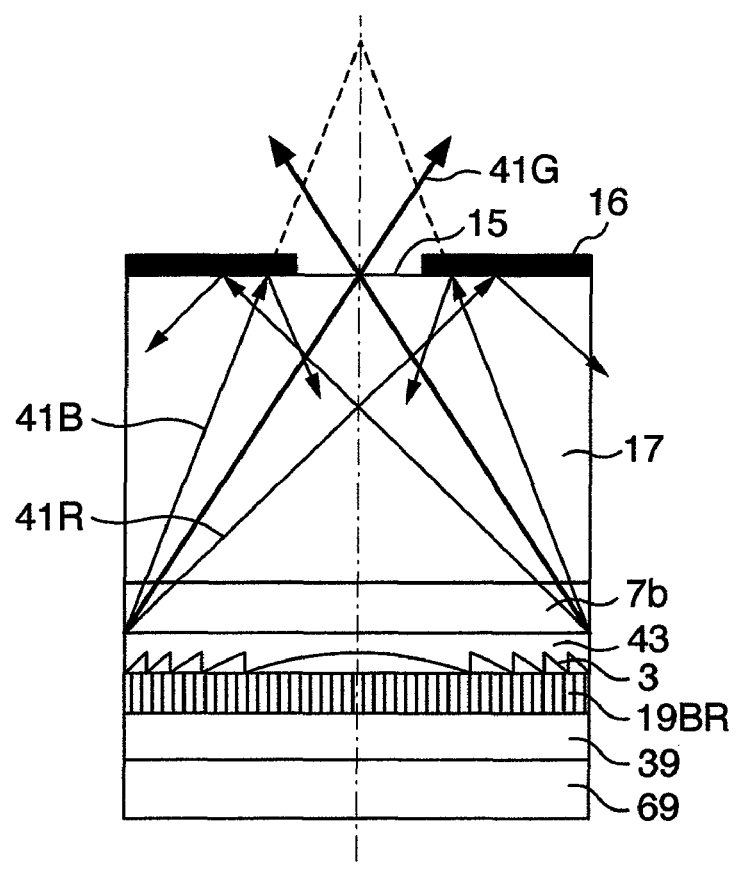
FIG. 11 is a cross-sectional view in which the periphery of a Fresnel lens of Embodiment 6 is enlarged.

In FIG. 11, there is shown an enlarged cross-sectional view of the vicinity of Fresnel lens 3. Fresnel lens 3 has a focal position which changes greatly depending on the wavelength. As a result, the pitch and lens height of Fresnel lens 3 were changed, adjusting to the transmission wavelength of the corresponding color separation filter. In FIG. 11, there is shown color separation filter 19BR corresponding to G subpixel 53G. Since Fresnel lens 3 was formed by adjusting to the G wavelengths, the light transmitted through color separation filter 19BR is collected so that the light collection diameter in transmissive aperture part 15 is reduced by means of Fresnel lens 3. An R wavelength light beam 41R has a focal distance which becomes shorter and forms a focal point on the near side of transmissive aperture part 15 and B wavelength light beam 41B forms a focal point on the inner side of transmissive aperture part 15.

In case the characteristics of color separation filter 19BR are sufficient, these light beams, B wavelength light beam 41B and R wavelength light beam 41R, are not transmitted through color separation filter 19BR, but in case the characteristics of color separation filter 19BR are not sufficient, both B wavelength light beam 41B and R wavelength light beam 41R are transmitted through color separation filter 19BR and are collected by Fresnel lens 3. However, as mentioned above, since the positions at which these light beams 41R and 41B are collected by Fresnel lens 3 differ from the G wavelengths, the quantity of light, of these light beams, which is transmitted through transmissive aperture part 15 is reduced. As a result, even in the case where the characteristics of color separation filter 19BR are not sufficient, it is possible to improve the color saturation by means of the characteristics of Fresnel lens 3. Also, by taking the backlight 59 side of reflective display part 16 to have high reflectance, light beams not transmitted through transmissive aperture part 15 can return to the backlight side, also making it possible to reutilize a part thereof.

In the present embodiment, by using Fresnel lens 3, it becomes easy to form the exterior shape of the lens to be a shape other than circular. Moreover, the description was given using a Fresnel lens, but there may also be taken a hologram lens having similar light collection performance.

Figure 12A:
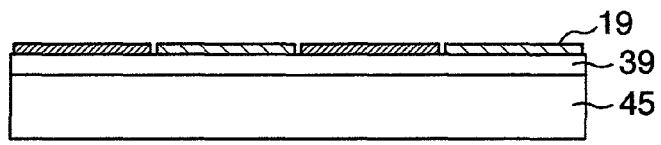
FIG. 12A is a cross-sectional view in which a color separation filter is formed on top of a supporting substrate and a film, in the fabrication method of Fresnel lenses and color separation filters.

In FIGS. 12A to 12E, there is shown an embodiment of a preparation method for color separation filters 19 and Fresnel lenses 3. First, a transparent film 39 is provided on top of support substrate 45 and color separation filters 19 are formed thereon (FIG. 12A). Together with changing the film structure so that the desired transmission spectra can be obtained to correspond to RGB subpixels 53, color separation filters 19 were formed into RGB subpixels 53 by patterning.

Figure 12B:
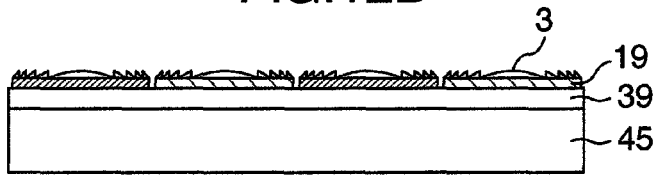
FIG. 12B is a cross-sectional view in which Fresnel lenses have been formed on top of the color separation filters.

Next, Fresnel lenses 3 were formed on top of color separation filters 19 (FIG. 12B). Fresnel lenses 3 had their pitch adjusted to the collected wavelengths. As for Fresnel lenses 3, it is possible to form them by using a photolithography technique and exposing and developing a transparent photoresist using a grey scale mask. Moreover, forming is also possible using laser imaging or electron beam imaging, and exposure. Alternatively, it is also acceptable to manufacture metal molds from these formed Fresnel lenses 3 and forming by the 2P method. As for the cross-sectional shape of the Fresnel lenses, it is desirable, if a smooth, ideal shape is chosen, to have a high light collection efficiency, but it is also acceptable to choose a step-like shape by means of multi-stage exposures, and also, in case the light collection efficiency is not taken to be so necessary, a binary shape may be chosen.

Figure 12C:
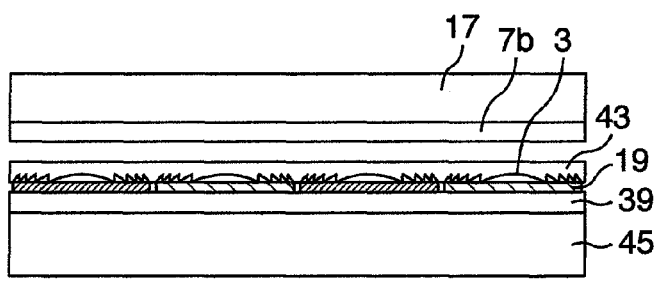
FIG. 12C is a cross-sectional view showing a state in which a supporting substrate and a lower substrate are pasted together.

Next, support substrate 45 shaping color separation filters 19 and Fresnel lenses 3 was pasted to lower substrate 17 via a pasting layer 43 (FIG. 12C). The refractive index of pasting layer 43 was made smaller than that of the material of Fresnel lenses 3. The greater the refractive index difference between pasting layer 43 and Fresnel lenses, the more the height of Fresnel lenses 3 can be reduced, something that is desirable.

Figure 12D:
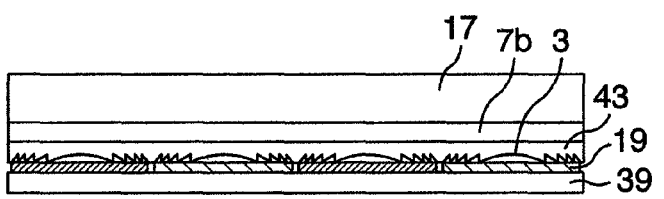
FIG. 12D is a cross-sectional view in which the supporting substrate has been eliminated.
Figure 12E:
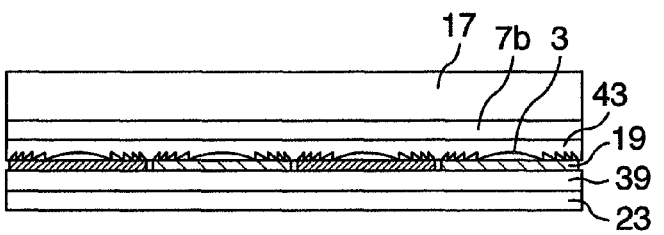
FIG. 12E is a cross-sectional view in which a reflection type polarizing plate is mounted.

Next, support substrate 45 was taken off and Fresnel lenses 3 and color separation filters 19 were transferred to the lower substrate 17 side (FIG. 12D). In order for film 39 to be easy to take off, it is desirable to make the adhesive strength between support substrate 45 and film 39 weak. At the very end, a reflective type polarizing plate 23 was pasted to film 39 (FIG. 12E).

By using a support substrate 45 with the same thermal expansion coefficient as that of lower substrate 17, and forming color separation filters 19 and Fresnel lenses 3 thereon, it is possible to control misalignment when pasting to lower substrate 17, enabling the whole to be pasted together without misalignment. Also, by providing film 39, the result is that it is possible, while making film 39 and color separation filters 19 adhere sufficiently well, to easily transfer color separation filters 19 and Fresnel lenses 3 to the lower substrate 17 side by making the adhesion between film 39 and support substrate 45 weak.

Also, by taking off support substrate 45, it is possible to make the liquid crystal display device thinner. Since, by using Fresnel lenses 3, the light collecting elements can also be made thinner, the liquid crystal display device can be made thin even if using Fresnel lenses 3 and color separation filters 19. Also, by using Fresnel lenses, the lens height does not become great even if taking embedded type lenses and aspherical lenses are easy to form. Moreover, by using pasting layer 43 and taking embedded type lenses, the refractive index is reduced and since, further, color separation filters 19 and reflective type polarizing plate 23 can be laminated, the number of air interfaces diminishes, so it is possible to reduce the losses due to reflection at the interfaces.

In the present embodiment, since color separation filters 19 are provided with adjustment to the transmission wavelengths of all color filters 11, it is possible to increase the light reutilization efficiency. Further, since color separation filters 19 are provided to correspond to the respective subpixel transmission wavelengths of all subpixels 53, it is acceptable not to use color filters 11 when the characteristics of color separation filters 19 are sufficient.

In the present embodiment, Fresnel lenses 3 were formed on top of color separation filters 19, but they may also be formed on top of polarizing plate 7b or lower substrate 17. Also, it is acceptable to not necessarily use film 39. As for backlight 59 used in the present embodiment, it is desirable to use a backlight 59 having high directivity in all directions so that sufficient light collection characteristics can be obtained with Fresnel lenses 3.

In the embodiments discussed this far, a description was given using a transflective type liquid crystal display device, but the present invention is not one limited to the transflective type, it also being possible to obtain a similar effect in the transmissive type. Also, the Fresnel lenses serving as cylindrical lenses according to Embodiment 6 may be used instead of the lenticular lenses used in Embodiments 1 to 5.

[Seventh Embodiment]

Figure 13:
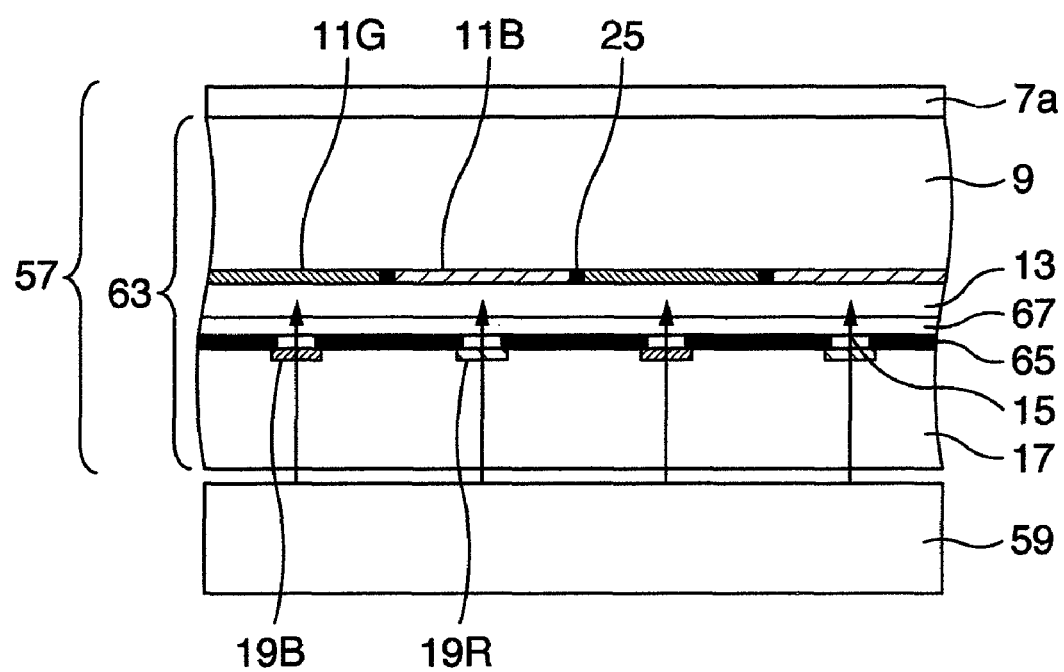
FIG. 13 is a cross-sectional view of a liquid crystal display device and a backlight of Embodiment 7.

Using FIG. 13, a description of Embodiment 7 of the present invention will be given. FIG. 13 shows a cross-sectional view of a backlight and a liquid crystal display element constituting a liquid crystal display device and corresponds to a cross section taken along line A-A' of FIG. 1A. Here, a transmissive type liquid crystal module was used as liquid crystal module 63.

A light beam emitted from the emitting face of backlight 59 is incident on lower substrate 17, a part thereof being transmitted through color separation filters 19 and transmitted through transmissive aperture parts 15. Alternatively, a part thereof is reflected by color separation filter 19R, and the remainder is transmitted. The light transmitted through transmissive aperture parts 15 is polarized linearly by means of in-call polarizing plate 67 incorporated on the liquid crystal layer 13 side with respect to lower substrate 17. Subsequently, it is transmitted through liquid crystal layer 13, color filters 11, upper substrate 9, and polarizing plate 7a, and the transmittance is switched to display an image. The structure of this liquid crystal module 63 may be taken to be the same as that of a normally used transmissive type liquid crystal display element, and in the case of an active matrix drive, it is acceptable to provide thin film transistors (TFT) and to carry out switching of a voltage impressed on the liquid crystal layer.

As color separation filters 19, the same as in Embodiment 1 may be used, and a color separation filter 19B, reflecting B wavelength light across a plurality of subpixels in RGW row 47, and a color separation filter 19R, reflecting R wavelength light in GBW row 48, were formed on the liquid crystal layer 13 side of lower substrate 17. As a result, in RGW row 47, B wavelength light is reflected in color separation filter 19B and returns to backlight 59, and similarly in GBW row 48, R wavelength light is reflected by color separation filter 19R and returns to backlight 59, is reflected by backlight 59, and is once again emitted to the liquid crystal display element 57 side, and reutilized. For that reason, in case color separation filters 19 are not provided, it is possible to improve the light reutilization efficiency of light that is absorbed by color filters 11 and not utilized.

Further, apart from transmissive aperture parts 15, there was provided a reflective layer 65 with high reflectance. As a result, the light that is incident on reflective layer 65 and is not transmitted through transmissive aperture parts 15 is reflected by reflective layer 65, returns to backlight 59, so it can be reutilized as well, and it is possible to improve the light utilization efficiency.

As in-call polarizing plate 67, it is possible to use a coated type polarizing plate or a wire grid polarizer. In case a wire grid polarizer is used, it may also function as a reflective type polarizing plate, since the polarized light not transmitted through the polarizer is reflected and returns to the backlight side. As a result, it is possible to also reflect the polarized light, not transmitted through the polarizer, on the backlight side and to reutilize it. In case a coated type polarizing plate is used as in-call polarizing plate 67, it is desirable to provide a reflective type polarizing plate on the backlight side of lower substrate 17.

In the present embodiment, two types of color separation filters according to Embodiment 1 were provided on the liquid crystal layer 13 side of lower substrate 17, but similarly to Embodiments 4 to 6 as well, it is possible, omitting the light collecting elements, to provide color separation filters on the liquid crystal layer 13 side of lower substrate 17. In case light collecting elements are provided, there is the effect that light is collected in transmissive aperture parts with small aperture ratios and can be transmitted with high efficiency, but in the case of a liquid crystal module with a high aperture ratio such as of the transmissive type, there can be obtained a brightness improvement effect without providing light collecting elements.

The liquid crystal display device of the present invention can be applied to a liquid crystal display device of the transmissive type or the transflective type and can in particular be applied to liquid crystal display devices having a small proportion of transmissive aperture parts, e.g. transflective liquid crystal display devices attaching great importance to reflection, and liquid crystal display devices of the transmissive or transflective type with high resolution.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising:
a liquid crystal display element including a liquid crystal layer, color filters, arranged for each of a plurality of subpixels obtained by pixel partitioning, said color filters each being configured to transmit a predetermined color wavelength by absorbing wavelengths other than said predetermined color wavelength, and transmissive aperture parts, provided on a substrate for each of said subpixels, and displaying an image by switching, with a voltage impressed on the liquid crystal layer, the quantity of light transmitted through said apertures;
a backlight for illuminating said liquid crystal display element;
color separation filters in which reflectance of light with wavelengths absorbed at said color filters is higher than reflectance of light with wavelengths transmitted through said color filters;
light collecting elements collecting light from said backlight in said transmissive aperture parts;
wherein said color separation filters are positioned between the color filters and the backlight and configured so that the light of the wavelength passed through said color filters is collected by the light collecting elements and the light of the wavelength absorbed at said color filters is reflected by said color separation filters toward the backlight, wherein each of the light collecting elements corresponds, in a direction of a section of each light collecting element having a curvature, to only one of the transmissive aperture parts.

2. The liquid crystal display device according to claim 1, wherein said light collecting elements are comprised of lenticular lenses.

3. The liquid crystal display device according to claim 1, wherein said light collecting elements are comprised of Fresnel lenses with an outer shape taken to be nearly rectangular.

4. The liquid crystal display device according to claim 1, wherein a polarizing plate is provided between said light collecting elements and said transmissive aperture parts.

5. The liquid crystal display device according to claim 1, wherein said backlight includes an organic film configured to operate as a light emitting layer.

6. A liquid crystal display device comprising:
a liquid crystal display element including a liquid crystal layer, color filters, arranged for each of a plurality of subpixels obtained by pixel partitioning, and transmissive aperture parts, provided on a substrate for each of said subpixels, and displaying an image by switching, with a voltage impressed on the liquid crystal layer, the quantity of light transmitted through said apertures; and
a backlight for illuminating said liquid crystal display element,
wherein said subpixels include red, green, and blue display subpixels, having high transmittance for respectively red, green, and blue wavelengths, and white display subpixels having high transmittance for all visible wavelengths;
further comprising:
a first array comprised of said red, green, white display subpixels, and not including blue subpixels, and a second array comprised of said green, blue, and white display subpixels, and not including red subpixels, wherein the first and second arrays are alternately arranged in parallel, in the row direction or the column direction; and
a first color separation filter associated with said first array and reflecting blue wavelength light more than red wavelength light and a second color separation filter associated with said second array and reflecting red wavelength light more than blue wavelength light, wherein the first and second color separation filters are arranged between the color filters and the backlight,
wherein the transmissive aperture parts are arranged on the side of the backlight of the liquid crystal layer, and
wherein a wavelength distribution passing through the transmissive aperture parts of the white display subpixels of said first array is different from a wavelength distribution passing through the transmissive aperture parts of the white display subpixels of said second array.

7. The liquid crystal display device according to claim 6, wherein an area of said transmissive aperture parts provided for said subpixels of said green display is greater than an area of said transmissive aperture parts provided for said subpixels of said red display and said blue display.

8. The liquid crystal display device according to claim 6, comprising, on said backlight side, with respect to said substrate, light collecting elements collecting, in said transmissive aperture parts, the light coming from said backlights,
wherein:
said light collecting elements are comprised of lenticular lenses in parallel with a first array and a second array; and
said first color separation filters and said second color separation filters, are arranged, with respect to said lenticular lenses, on the side of said backlight.

9. The liquid crystal display device according to claim 8, wherein, on said liquid crystal layer side of said substrate, there are formed third color separation filters for reflecting green wavelength light.

10. The liquid crystal display device according to claim 8, wherein said first color separation filters and said second color separation filters are formed on a face away from said backlight of said substrate.

11. The liquid crystal display device according to claim 6, wherein said first color separation filters and said second color separation filters are formed on said liquid crystal layer side of said substrate.

12. A liquid crystal display device comprising:
a liquid crystal display element including a liquid crystal layer, color filters, arranged for each of a plurality of subpixels obtained by pixel partitioning, said color filters each being configured to transmit a predetermined color wavelength by absorbing wavelengths other than said predetermined color wavelength, and transmissive aperture parts, provided on a substrate for each of said subpixels, and displaying an image by switching, with a voltage impressed on the liquid crystal layer, the quantity of light transmitted through said apertures;
a backlight for illuminating said liquid crystal display element; and color separation filters in which reflectance of light with wavelengths absorbed at said color filters is higher than reflectance of light with wavelengths transmitted through said color filters;

light collecting elements collecting light from said backlight in said transmissive aperture parts, wherein said color separation filters are positioned between the color filters and the backlight and each include means for absorbing a predetermined wavelength of light from the backlight and for reflecting the absorbed light back to the backlight so that the reflected light can be re-utilized to improve efficiency, wherein each of the light collecting elements corresponds, in a direction of a section of each light collecting element having a curvature, to only one of the transmissive aperture parts.

13. The liquid crystal display device according to claim 6, wherein the wavelength distribution passing through the transmissive aperture parts of the white display subpixels of said first array is yellow and the wavelength distribution passing through the transmissive aperture parts of the white display subpixels of said second array is cyan.

* * * * *